Patented Aug. 14, 1945

2,382,260

UNITED STATES PATENT OFFICE 2,382,260

TREATMENT OF AROMATIC COMPOUNDS

Raymond E. Schaad, Chicago, Ill., assignor to Universal Oil Products Company, Chicago, Ill., a corporation of Delaware No Drawing. Application April 12, 1941,
Serial No. 388,261

4 Claims. (Cl. 260—671)

This invention relates to the manufacture of organic compounds having both aromatic and olefinic properties. In a more specific sense the invention has reference to a process for reacting aromatic compounds, particularly aromatic hydrocarbons, with diolefinic hydrocarbons in the presence of a catalyst to produce desirable substances which may be used as such or as intermediates in organic syntheses. Certain of these reaction products consisting of aromatic compounds with unsaturated side chains may be referred to broadly by the term alkenyl aromatic compounds.

In one specific embodiment the present invention comprises a process for producing alkenyl aromatic compounds which comprises subjecting a mixture of a diolefinic hydrocarbon and an aromatic compound to contact with a composite of zinc chloride and a substantially inert carrier.

Diolefinic hydrocarbons which are reacted with aromatic compounds according to the process of this invention may be normally gaseous or liquid and may consist of conjugated or non-conjugated diolefins. Diolefinic hydrocarbons such as butadiene may be formed synthetically or produced by dehydrogenation of mono-olefinic hydrocarbons having a corresponding number of carbon atoms per molecule.

Aromatic hydrocarbons which are treated according to the process of the present invention comprise benzene, toluene, other alkylated benzenes, naphthalene, alkylated naphthalenes, other poly-nuclear aromatic hydrocarbons, etc., which are obtainable by the distillation of coal, by the dehydrogenation and cyclization of aliphatic hydrocarbons, and by other means. Other aromatic compounds which may be converted into alkenylated aromatic compounds, although not necessarily under identical conditions of operation, comprise halogenated aromatic hydrocarbons, phenols, aromatic acids, aromatic ketones, etc. The different aromatic compounds which are not necessarily equivalent in their reaction with diolefinic hydrocarbons may be reacted therewith under modified conditions of temperature and pressure in the presence of a composite of zinc chloride and a carrier to produce desirable substances, having aromatic and/or olefinic properties, such substances or reaction products being utilized as such or employed as intermediates in the production of other organic compounds.

According to the process of the present invention, a mixture of an aromatic compound and a diolefinic or higher poly-olefinic hydrocarbon may be subjected to contact with a composite of zinc chloride and a carrier at a temperature of from about 150° to about 450° C. under a pressure of from substantially atmospheric to approximately 100 atmospheres. The addition of hydrogen and/or hydrogen chloride to the reaction mixture frequently has a beneficial effect upon the reaction.

It is generally known that conjugated diolefins are usually more reactive than the corresponding non-conjugated diolefins and in cases involving the conjugated compounds, less severe conditions of temperature, pressure, and time of contact with the catalyst are usually necessary than when employing non-conjugated diolefins. In order to form a reaction product containing a substantial proportion of alkenyl aromatic compounds and other more complex reaction products, it is preferable that from about 2 to about 40 molecular proportions of aromatic compound should be present per molecular proportion of diolefinic hydrocarbon in order to diminish polymerization of the diolefinic hydrocarbon and to favor its interaction with the aromatic compound being treated.

The preferred catalyst for use in effecting the process of the present invention is a composite of zinc chloride and a carrier such as alumina, pumice, charcoal, silica gel, raw or acid-treated clay, composite silica and alumina, crushed porcelain, etc. The different carriers which may be employed are not necessarily equivalent in their action.

The proportions of zinc chloride and carrier may be varied as desired to make catalyst composites of different activities. Thus it has been found possible and practical to make stable granular catalysts by using from about 5 to about 50% by weight of zinc chloride and from about 95 to about 50% by weight of a carrier, preferably alumina or a material containing a substantial proportion of alumina. These materials in finely powdered form after thorough mechanical mixing may be subjected to drying, pelleting, and heating operations to produce formed particles of catalyst suitable for use as reactor filling material. A suitable carrier may also be impregnated with an aqueous solution of zinc chloride, dried, and calcined at a temperature between about 250° and about 350° C. to form a zinc chloride-carrier composite suitable for use in promoting the interaction of a diolefinic hydrocarbon with an aromatic hydrocarbon.

The catalyst compositions indicated in the specification and claims are shown in terms of the proportions of the materials from which the catalyst composites are prepared rather than the exact compositions of the composites which may be somewhat different due to formation of some zinc hydroxychloride, zinc oxychloride, or other material resulting from hydrolysis or partial hydrolysis of a portion of the zinc chloride or to other conversions which are not clearly understood.

Interaction of aromatic and diolefinic hydrocarbons may also be effected in the presence of the above indicated catalyst and of hydrogen or hydrogen chloride. There is little or no carbon formation upon the catalyst when the reactions described are carried out under hydrogen pressure but carbon formation does occur to a substantial extent in the absence of hydrogen. Hydrogen chloride which may be introduced to the reaction mixture alone or with hydrogen, appears to exert a promoting effect upon the activity of the zinc chloride-containing catalyst.

Although the following concepts on the mechanism of the reactions involved in the process are not to be misconstrued to limit the invention, the reaction between an aromatic hydrocarbon and a diolefinic hydrocarbon in the presence of the catalysts hereinabove set forth are considered to be basically of a relatively simple character, and in the case of conjugated diolefins this reaction apparently generally involves the so-called 1,4-addition of the aromatic hydrocarbon to the diolefin to produce an aryl alkene. Aryl alkenes which may be formed by such additions of an aromatic hydrocarbon to a conjugated diolefin are capable of undergoing isomerization and also condensation reactions in the presence of the catalysts of the type hereinabove set forth. Such isomerizations frequently involve a shift in position of the double bond in the alkene chain of the aryl alkene formed by the alkylation reaction. Further isomerization may involve migration of an alkyl group within the aryl alkene structure.

Thus a mixture of an aromatic hydrocarbon and a diolefinic hydrocarbon may be passed through a suitable reactor such as a vertical tower containing a fixed section of granular catalyst or a portion of the aromatic hydrocarbon used may be charged to such a reactor while the diolefinic hydrocarbon, as such or preferably diluted by another portion of the aromatic hydrocarbon, may be introduced at various points throughout the length of the catalyst reactor in such a way that the hydrocarbon mixture being contacted with the catalyst will contain a relatively low proportion of the diolefinic hydrocarbon, thus favoring interaction of aromatic and diolefinic hydrocarbons rather than polymerization of the latter.

While the foregoing method of passing the reaction mixture downwardly through a suitable reactor containing the granular catalyst is more customary procedure, the interaction of aromatic and diolefinic hydrocarbons may also be effected in closed vessels in which some of the reacting constituents are in liquid phase and in which the catalyst as particles or powder is maintained in suspension by some method of agitation. Reacting constituents in mixed phase may also be forced together through stationary sections of the catalyst or said constituents may be contacted with a powdered catalyst to effect a similar type of reaction. The choice of operating procedure will depend upon such circumstances as the temperature and pressure observed to be most effective in producing the desired type of reaction between aromatic and diolefinic compounds.

Contrasting the action of zinc chloride-containing catalysts for promoting interaction of aromatic and diolefinic hydrocarbons with the action of sulfuric acid used for the same purpose, the zinc chloride-containing catalyst has a more moderate and controllable action with substantially no tendency to oxidize or unduly promote polymerization of the diolefin at the expense of the desired reaction. This may be particularly in evidence in case the diolefin is conjugated. When using sulfuric acid as catalyst for interacting an aromatic hydrocarbon with gaseous butadiene, the latter produced synthetically, or recovered by suitable means from gases formed as by-products in oil cracking reactions, the polymerization reaction may proceed to the extent of forming polymers of high molecular weight which approach the consistency of resins or high molecular gums. With sulfuric acid as catalyst there is a tendency toward the formation from benzene and butadiene of small amounts of di-phenyl butane and relatively larger amounts of heavier products, while more desirable unsaturated aromatic compounds such as the phenyl butenes undergo other reactions and are lost to a substantial degree in the sulfuric acid layer. It is not to be implied, however, that diolefin polymerization can be avoided entirely in the presence of zinc chloride-containing catalysts as hereinabove set forth, but that the undesirable reactions may be reduced substantially.

In general, the products formed by interaction of a diolefinic hydrocarbon with a molal excess of an aromatic hydrocarbon are separated from the unreacted aromatic hydrocarbon by suitable means as by distillation and the unreacted portion of the aromatic hydrocarbon originally charged is returned to the process and mixed with additional quantities of the diolefinic and aromatic hydrocarbons being charged to contact with the zinc chloride-containing catalyst.

The following example is introduced to show results normally expected by the operation of the process, although with no intention of unduly limiting the generally broad scope of the invention.

A mixture of 1 molecular proportion of 1,3-butadiene and 8 molecular proportions of benzene is passed at 225° C. under a pressure of 40 atmospheres downwardly through a reactor containing a granular material formed by compositing 25% by weight of zinc chloride with 75% by weight of activated alumina. Under these conditions, while 2 volumes of liquid reaction mixture pass over one volume of catalyst per hour, substantially all of the butadiene reacts with approximately 1.5 molecular proportions of benzene to form a product, which after separation of excess benzene contains about 50% by volume of phenyl butenes. On the average the other products boiling higher than phenyl butenes are derived from approximately 1 molecular proportion of butadiene and 2 molecular proportions of benzene or from multiples of these respective proportions.

The character of the invention and the results obtainable by its use will be evident from the preceding specification and example, although they are not to be considered as imposing undue limitations upon its generally broad scope.

I claim as my invention:

1. A process for treating benzene to produce substantial yield of phenyl butenes which comprises subjecting from about 2 to about 40 molecular proportions of said benzene to the action of 1 molecular proportion of butadiene at a temperature of from about 150° to about 450° C. under a pressure of from substantially atmospheric to approximately 100 atmospheres in the presence of a composite comprising essentially zinc chloride and a carrier.

2. A process for treating an aromatic hydrocarbon to produce a substantial yield of aryl alkenes which comprises subjecting from about 2 to about 40 molecular proportions of said aromatic hydrocarbon to the action of 1 molecular proportion of a diolefinic hydrocarbon at a temperature of from about 150° to about 450° C. under a pressure of from substantially atmospheric to approximately 100 atmospheres in the presence of a composite comprising essentially zinc chloride and a carrier.

3. A process for treating an aromatic hydrocarbon to produce a substantial yield of aryl butenes which comprises subjecting from about 2 to about 40 molecular proportions of said aromatic hydrocarbon to the action of 1 molecular proportion of butadiene at a temperature of from about 150° to about 450° C. under a pressure of from substantially atmospheric to approximately 100 atmospheres in the presence of a composite comprising essentially zinc chloride and a carrier.

4. A process for treating benzene to produce a substantial yield of phenyl alkenes which comprises subjecting from about 2 to about 40 molecular proportions of said benzene to the action of 1 molecular proportion of a diolefinic hydrocarbon at a temperature of from about 150° to about 450° C. under a pressure of from substantially atmospheric to approximately 100 atmospheres in the presence of a composite comprising essentially zinc chloride and a carrier.

RAYMOND E. SCHAAD.